Patented May 14, 1940

2,201,063

UNITED STATES PATENT OFFICE 2,201,063

SHORTENING

Benjamin H. Thurman, Bronxville, N. Y., assignor to Refining, Inc., Reno, Nev., a corporation of Nevada No Drawing. Application August 1, 1939,
Serial No. 287,839

6 Claims. (Cl. 99—123)

This invention relates to shortening, and more particularly to high ratio shortenings, that is to say, shortenings particularly adapted for cakes and pastries in which it is desirable to employ a high ratio of sugar to flour.

In baked goods such as cakes, ordinary shortenings require that the ratio of sugar to flour be usually less than one to one, otherwise the baked product becomes of coarse texture and falls during the baking. It is desirable to employ as much sugar as possible in such baked products, as the presence of greater amounts of sugar than flour produces a richer product and also causes the product to retain moisture to a greater degree. Moisture retention prevents the baked products from quickly becoming stale.

In accordance with the present invention, I have found that a small amount of vegetable phosphatides of the type recovered from vegetable oils of relatively low unsaturation, i. e., those free of linolenic acid, can be incorporated into baking mixes and that the presence of the type of phosphatides mentioned enables the ratio of sugar to flour to be raised from the conventional maximum 1 to 1 ration to ratios as high as 1.4 or 1.5. As pointed out above, this is accomplished without deleteriously affecting the texture of the baked product or causing the same to fall during baking to produce "sad" products. The phosphatides are desirably incorporated into the shortening employed in the baking mix. I have found that from approximately 1 to 5% of the type of phosphatide mentioned, depending upon the particular shortening selected and the nature of the baked product, enables the shortening to be employed in baked products with the high sugar-to-flour ratio mentioned.

The addition of soya bean lecithin to shortenings and baked products for the purpose of increasing the sugar-to-flour ratio has been suggested. However, the nature of the soya bean lecithin prevents the employment of adequate amounts thereof, as considerably more soya bean lecithin is required for a given sugar-flour ratio than is the case with the phosphatides of the present invention, and also soya bean lecithin has a characteristic odor and taste which limits the amount usable in high quality bakery products. Soya bean lecithin contains linolenic acid radicals which have, or rapidly acquire, a characteristic paint or fish odor and taste. This unpleasant flavor of the soya bean lecithin is aggravated by baking temperatures. Furthermore, under baking temperature soya bean lecithin tends to discolor so as to darken the color of the baked product, and in addition, amine-like odors and tastes develop at the baking temperatures. For these reasons, among others, soya bean lecithin has not been commercially employed to produce a high sugar-flour ratio shortening for baked products.

The phosphatides of the present invention are entirely free of linolenic acid radicals or other radicals having more than two double bonds. They have no noticeable odor or taste when incorporated into shortenings or baked products and are heat stable under baking conditions. Thus, greater amounts can be employed, if necessary, to enable a desired high sugar-to-flour ratio to be employed. In fact, the phosphatides may be substituted for a part of the shortening to any extent desired or found necessary, as the phosphatides themselves have shortening properties. Usually, however, from 1 to 5% phosphatides on the basis of the total shortening employed are sufficient for any reasonable ratio of sugar to flour.

In addition, the phosphatides of the present invention produce a finer texture of the baked product than soya bean lecithin and are not as sensitive to salts and other electrolytes employed in baked products. It has been found that the presence of free fatty acids is not necessary, as is usually the case with soya bean lecithin in order to enable high ratios of sugar to flour to be used. The phosphatides of the present invention also tolerate more sugar without the baked product falling than is the case with soya bean lecithin. Also, shortenings of the present invention containing vegetable phosphatides free of linolenic acid can be employed as general purpose shortenings in addition to their use as high ratio shortenings. As the phosphatides contemplated in the present invention are heat stable, the shortening can be used for frying, greasing baking untensils, etc., without developing deleterious odors or tastes. Shortenings containing soya bean lecithin discolor and develop the characteristics soya bean odor and flavor when subjected to such temperatures.

Any suitable shortening can be employed in combination with the linolenic acid free phosphatides, for example, animal shortenings such as lard, hydrogenated shortenings such as cottonseed, soya bean, peanut oil, etc., or compound shortenings such as mixtures of lard and hydrogenated oil, liquid oils, etc. If margarine or butter is employed as a baking shortening, the phosphatides contemplated in the present invention may likewise be employed therewith and increase the water retention properties of the margarine. Furthermore, the phosphatides of the present invention stabilize shortenings containing soya bean oil either as a liquid oil or hydrogenated product. Such shortenings containing soya bean oil tend to revert to the characteristic odor and flavor of the soya bean oil, particularly under cooking temperatures. The presence of the phosphatides contemplated in the present invention prevent such reversion even under repeated heatings of the shortening, and thus not only enable high ratio baked products to be produced but enable soya bean oil shortenings to be employed therein.

Crude vegetable oils of the type which are free of acid radicals of greater unsaturation than two double bonds form an excellent source for the type of phosphatides contemplated by the present invention. Such phosphatides, when recovered from crude oils as contra-distinguished from the commercial lecithin obtained by a multi-solvent treatment upon the seeds themselves, are free of many deleterious impurities such as free bound sugar or glycosides (bitter principles) and when obtained from corn or cottonseed oil are further characterized by their freedom of linolenic acid, as herein discussed and as referred to in my copending application Serial No. 212,599, filed June 8, 1938, of which the present application is a continuation in part. As stated in the said application Serial No. 212,599, the preferred process of recovering such phosphatides from vegetable oils is disclosed in detail in the then copending application Serial No. 6,446, filed February 14, 1935, now Patent No. 2,150,732. The phosphatidic material, along with various other materials, may be precipitated with water or electrolytes and centrifugally or otherwise separated from the oil. The crude phosphatidic material or gums may be treated to recover purified phosphatides by the following steps. The water may first be evaporated from the gums in vacuo, preferably at relatively low temperatures. The dry material may then be treated with a solvent for phosphatides, for example, hydrocarbon solvents such as hexane, petroleum ether, benzol, etc., to dissolve the phosphatides. The mixture may then be separated by centrifugal separation, decantation or filtration. The insoluble residue contains meal, inorganic salts, proteins, resins, carbohydrates, etc., and, for the purpose of the present invention, can be discarded. By evaporating the hydrocarbon solvent from the phosphatide solution, phosphatides containing a small amount of oil and suitable for use in the present invention are recovered. If desired, the phosphatides can be recovered in a still further purified form. Acetone may then be added to the solution to precipitate the phosphatides which may be separated from the solution by decantation, filtration or centrifugal separation. The residue may be repeatedly washed with acetone to remove non-phosphatidic materials. Any residual acetone may then be evaporated to produce substantially pure phosphatidic material.

Corn phosphatides are preferred, since they are of light color and appear to have most effective sugar tolerance, although cottonseed, sesame and other similar phosphatides which are free of linolenic acid may be employed.

By way of example, the following cake formulae are typical of baked products which can be produced in accordance with the present invention:

*White layer cake*

| | |
|---|---|
| Sugar | 31.5 |
| Flour | 21.5 |
| Shortening | 10.5 |
| Salt | 1.0 |
| Baking Powder | 1.0 |
| Milk | 21.5 |
| Egg White | 13.0 |
| | 100.0 |

*Yellow cake*

| | |
|---|---|
| Sugar | 30.5 |
| Flour | 22.5 |
| Shortening | 11.5 |
| Salt | 1.0 |
| Baking Powder | 1.0 |
| Milk | 21.0 |
| Whole Egg | 12.5 |
| | 100.0 |

In the first example given above relating to a white layer cake, the shortening employed therein contained 3% purified corn phosphatide, while in the second cake formula given the shortening contained 1½% purified cottonseed phosphatide. The percentages of phosphatides in both examples were based upon the total amount of shortening and phosphatide employed in the cake mixture. Even though the ratio of sugar to flour is greatly in excess of a 1 to 1 ratio, the above formulas produce cakes of uniform fine texture with no tendency toward falling during baking. The moisture content is relatively high and the cakes retain their moisture content so as to remain fresh.

While the above examples relate to products containing chemical leavening ingredients, similar results are produced with yeast raised baked products. Yeast raised products, in which are incorporated the phosphatides contemplated by the present invention, are of larger volume and retain their moisture content for greater periods of time, even in the presence of high sugar-to-flour ratios.

This application is a continuation in part of my application Serial No. 212,599, filed June 8, 1938, which in turn is a continuation of application Serial No. 6,446, filed February 14, 1935, now Patent No. 2,150,732, dated March 17, 1939.

While I have disclosed the preferred embodiments of my invention, it is understood that the details thereof may be varied within the scope of the following claims.

I claim:

1. As a new product of manufacture, shortening capable of being employed in baked products having high ratios of sugar to flour which comprises shortening prepared from a refined glyceride oil in admixture with a small proportion of vegetable phosphatidic material free from fatty acid radicals having more than two double bonds, said phosphatidic material having been isolated from crude vegetable oils free from fatty acid radicals having more than two double bonds and being concentrated and substantially free of deleterious ingredients.

2. The product as defined in claim 1 in which the phosphatidic material is obtained from crude corn oil.

3. The product as defined in claim 1 in which the phosphatidic material is obtained from crude cottonseed oil.

4. The product as defined in claim 1 in which the glyceride oil comprises refined cottonseed oil.

5. The product as defined in claim 1 in which the glyceride oil comprises refined cottonseed oil and in which the phosphatidic material is obtained from crude corn oil.

6. As a new product of manufacture, shortening capable of being employed in baked products having a ratio of sugar to flour in excess of 1 to 1, which comprises a refined semi-solid glyceride fat in admixture with approximately 1 to 5% of vegetable phosphatidic material free from fatty acid radicals having more than two double bonds, said phosphatidic material having been isolated from crude vegetable oils free from fatty acid radicals having more than two double bonds and being concentrated and substantially free of deleterious ingredients.

BENJAMIN H. THURMAN.